United States Patent Office 2,795,159
Patented June 11, 1957

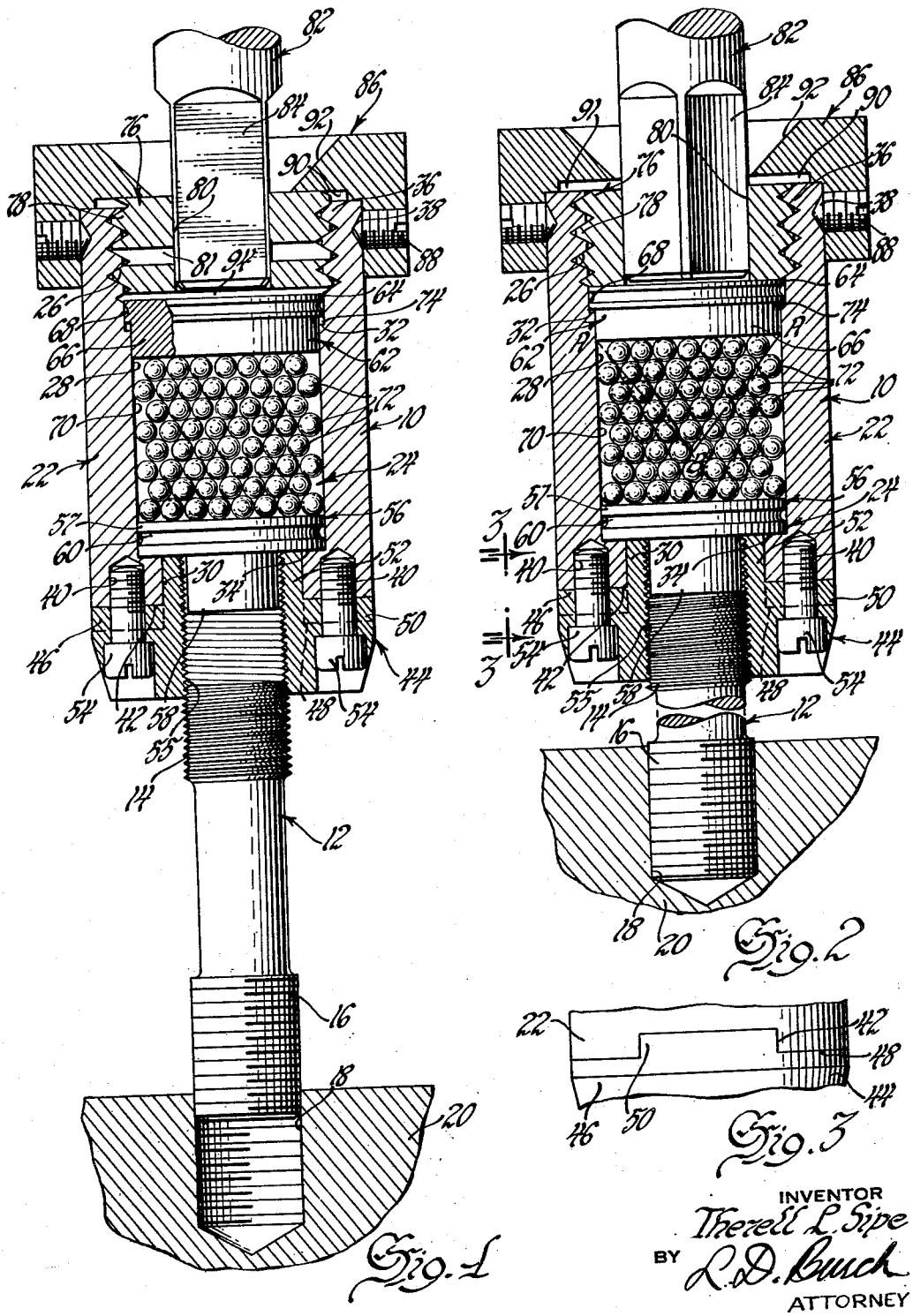

2,795,159

STUD SETTING TORQUE DEVICE AND THE LIKE

Therell L. Sipe, North Olmsted, Ohio, assignor to General Motors Corporation, Detroit, Mich., a corporation of Delaware Application August 24, 1955, Serial No. 530,267

6 Claims. (Cl. 81—53)

This invention relates generally to devices for the transmission of torque, and more particularly to devices such as tools for setting studs.

One example of the numerous devices employed to transmit torque in a single direction is the tool commonly known as a stud setter. Since the stud has no head, such a device usually includes means for jamming the threads of the stud within the device so that the stud must rotate with the device.

In certain applications, extreme torque must be applied to the stud to sufficiently tighten the same against loosening in service. It is essential in such instances that the tool may be removed from the stud without loosening the stud from its fully tightened condition.

While stud setting devices presently used are capable of applying the necessary torque, the parts thereof often lock together or to the stud to the extent that the stud is loosened in separating these parts so that the tool may be removed.

This problem is not limited to stud setting devices, but is encountered in various forms in torque transmitting devices generally.

It is now proposed to provide a stud setting tool which is not only novel in the particular details of construction thereof, but which may be removed from the stud without loosening the same under extreme applications of torque. The latter is accomplished by designing the tool in a manner to make use of a principle related to the bulb of pressure principle known to civil engineering. More specifically, the principle employed involves the use of a contained semi-fluid mass in which pressure applied thereto is partially dissipated through internal friction thereof rather than being transmitted equally in all directions to the walls of the container.

While the above feature of the invention is applicable to torque devices generally, it is specifically embodied, for purposes of illustration only, in the novel stud setting tool described in the following specification and shown by the attached drawings wherein:

Figure 1 is an axial cross-sectional view of a stud setting tool embodying the invention and illustrating the condition thereof in the starting position of the stud.

Figure 2 is a view similar to Figure 1 and illustrating the condition of the tool in the tightened position of the stud.

Figure 3 is a view taken in the direction of arrows 3—3 of Figure 2.

Referring to the drawings in greater detail, and particularly to Figure 1, the tool 10 is used to tighten the stud 12 having threaded ends 14 and 16 into the tapped hole 18 in the support member 20.

The tool 10, all of the parts of which are preferably annular and fitted in telescoped relation, comprises a hollow cylindrical body 22 having an axial cylindrical passage 24 formed to provide three sections 26, 28 and 30 having progressively decreasing diameter and resulting in shoulders 32 and 34. The section 26 is formed to provide internal threads 36, external recesses 38 and the body 22 is provided with tapped holes 40. A slot 42 preferably extends diametrically across the end of the body 22 having the tapped holes 40.

The adaptor 44 is fitted so that the flange 46 thereof engages the end 48, the lug 50 is disposed in the slot 42 as is shown in Figure 3 and the tubular extension 52 is received in the section 30. The adaptor 44 is secured to the body 22 by any suitable fastening means such as bolts 54, and the adaptor 44 has an internally threaded axial passage 55 to receive the threads 14 of the stud 12. Although the adaptor 44 could be made integral with the body 22, it is preferable to provide separate interchangeable adaptors having various thread sizes and types to accommodate different sizes and types of studs.

A lower pressure plate member 56 having a disk portion 57 and a cylindrical portion 58 is positioned in the passage 24 so that the disk 56 may engage the shoulder 34 and so that the portion 58 extends into the threaded passage 55. The external dimensions of member 56 are such that it may be inserted axially within passage 24 from the end thereof having the larger internal diameter. The disk 57 may have a groove 60 formed therein to retain oil or other lubricating material.

An upper pressure plate member 62 similar to member 56 and having a disk 64 positioned in section 26 and a cylindrical portion 66 positioned in section 28 is disposed with clearance in passage 24. The disk 64 may also be provided with a groove 68.

The chamber 70 formed by the annular walls of section 28 and the pressure plate members 56 and 62 is filled with a plurality of steel or other shot 72 to the extent that clearance 74 will always be maintained between disk 64 and shoulder 32. In lieu of steel shot, the chamber 70 may be filled with any granular or other semi-fluid mass that provides what may be termed a mechanical fluid having relatively high internal friction.

A driving member 76 having external threads 78 engaging threads 36 in section 26 and a non-circular axial passage 80 is disposed in passage 24. The member 76 is adapted to be moved axially against or away from the pressure plate member 62 by rotating the same by means of any suitable tool 82 having a non-circular portion 84 seated in the non-circular passage 80. Transverse passages 81 may be provided therein for lubricating or other purposes.

A stop member 86 is secured to the body 22 by means of screws 88 which seat in recesses 38. Also, other mechanical means may be used for this function. The inner annular recess 90 provides clearance 91 into which the driving member 76 may be backed off as shown by Figure 1, and the tapered axial opening 92 provides easy entrance of tool 82 into the passage 80.

Figure 1 illustrates the starting position of the stud setter tool 10 preparatory to setting the stud 12, the end 16 of which has been partially threaded into the support 20. It will be noted that the stud setter 10 has been partially threaded on the end 14 of the stud and the tool 82 has been inserted into the driving member 76.

More than likely, the stud setter has already been previously used to set a stud, in which case the driving member 76 has been backed off in removing the stud setter from the stud so that it engages the stop member 86. In this condition, none of the parts of the stud setter 10 are under load, and there is clearance 94 between driving member 76 and pressure plate 62.

When it is desired to tighten the stud 12, the tool 82 is rotated to screw the driving member 76 down against the upper pressure plate 62. At about the same time, depending upon the relative friction between the various parts, including the stud 12 and the support 20, the end 14 of the stud will screw up into the adaptor 44 until it engages the portion 58 of the lower pressure plate member 56 and the end 16 of the stud will screw down into the support member 20. This condition is shown by Figure 2.

As the tool 82 is rotated further, the pressure plates 56 and 62 are forced toward one another until the shot or other mass 72 is compressed within the chamber 70. In this state, further axial movement of the parts within the tool 10 is prevented, and the threads 36 and 78 and the threads 14 and 55 are jammed. This being so, tools 82 and 10 and stud 12 must turn together until the stud 12 is sufficiently tight.

In the loaded condition shown by Figure 2, force is applied by the end 14 of the stud 12 to the pressure plate 56 and then to the mass 72.

If the chamber 70 were filled with a fluid such as hydraulic oil, the above force would be distributed evenly to all the walls forming the chamber 70. In other words, the unit pressure on section 28 and on pressure plates 56 and 62 would be the same. Similar axial forces would occur where a solid member were disposed between pressure plates 56 and 62.

However, with the use of a semi-fluid mass, force applied by end 14 of the stud 12 is gradually dissipated through internal friction of the mass 72 in a manner similar to the dissipation of pressure in soil under a footing. One difference between the two situations is, of course, that the mass 72 in the present instance is contained so that the peripheral walls of section 28 forming the chamber 70 prevent lateral displacement thereof.

At any rate, the result is that the mass 72 is divided gradually into portions of higher pressure represented schematically by that below the intersecting broken lines AB in Figure 2 and portions of lower pressure illustrated by that above the broken lines AB. In other words, the force on pressure plate 62 is considerably less than the force on pressure plate 56. This principle is illustrated very simply and clearly by likening the same to the difficulty encountered in filling an open pipe with sand and then trying to remove the sand by pushing it through the pipe. Even a relatively short column of sand is very difficult to dislodge.

It is thus apparent that the pressures at the interfaces between the pressure plate 62 and the driving member 76 and between the threads 36 and 78 are also reduced so that these parts will not freeze or stick under conditions of extreme torque applied to stud 12. Thus, when the stud 12 is sufficiently tightened, the tool 82 is easily rotated in the reverse direction in order to back off the driving member 76 and to thereby relieve the pressure on plate 62 as shown by Figure 1. This immediately relieves the pressure on the mass 72, and the grip on the end 14 of the fully tightened stud 12 is released so that the tool 10 may be removed therefrom.

While the specification and attached drawings illustrate a single specific embodiment of the invention, it is to be understood that various changes may be made in the specific structure shown without departing from the scope of the invention and that the invention has general application in torque devices of all kinds.

What is claimed is:

1. A stud driving device, comprising a hollow cylindrical body having spaced axially movable walls therein at opposite ends thereof, a plurality of particles disposed between said walls, threaded means at one end of said body for applying axial force to the adjacent wall of said movable walls and to said particles, means preventing said threaded means from being removed completely from said body, internally threaded means at the opposite end of said body adapted to receive a stud, said means permitting said stud to engage said other movable wall to apply axial force thereto and to said particles, the friction between said particles dissipating said force.

2. A stud driving device, comprising a hollow cylindrical body having spaced axially movable walls therein at opposite ends thereof, a semi-fluid mass disposed between said walls, means at one end of said body for applying axial force to one of said movable walls and to said semi-fluid mass, means preventing said means from being removed completely from said body, internally threaded means at the opposite end of said body adapted to receive a stud, said means permitting said stud to engage said other movable wall to apply axial force thereto and to said semi-fluid mass, the friction in said semi-fluid dissipating said force.

3. A torque device including a hollow body formed to provide side walls and end walls defining a chamber, said chamber containing a semi-fluid having internal friction, one of said walls being adapted to apply a certain axial force to said semi-fluid during the transmission of torque by said device, said force being transmitted through said semi-fluid in a manner to provide a portion thereof transmitting lesser force to said other end wall.

4. A torque device including a hollow body formed to provide side walls and cooperating end walls defining a chamber, said chamber containing a semi-fluid having relatively high internal friction, means including one of said walls adapted to apply a certain axial force to said semi-fluid during the transmission of torque by said device, said force being dissipated by said semi-fluid to provide a portion thereof transmitting lesser force to said other end wall.

5. A torque transmitting device having a casing defining a chamber and end walls therefor threadedly engaged with said casing, a pair of discs respectively engageable with said end walls and disposed as axially spaced pistons in said chamber with a semi-fluid mass contained therebetween, means for moving one of said discs toward the other of said discs with a certain axial force, said semi-fluid mass being adapted to absorb a portion of said force and transmit a portion of said force to said other disc whereby torque imposed on one of said end walls may be transmitted to the other of said end walls in one direction only.

6. In a torque transmitting mechanism for setting studs, a casing having end walls and defining a cylindrical chamber between said end walls, said end walls being threadedly engaged with said casing, a pair of axially spaced pistons disposed in said chamber with a semi-fluid mass contained therebetween and uninterruptedly extending diametrically across said chamber, means for moving one of said pistons toward the other of said pistons with a certain axial force, said semi-fluid mass being adapted to absorb a portion of said force and transmit a portion of said force to said other piston whereby torque imposed on one of said end walls may be transmitted to the other of said end walls in one direction only.

References Cited in the file of this patent

UNITED STATES PATENTS

| | | |
|---|---|---|
| 1,238,098 | Brinton | Aug. 28, 1917 |
| 1,548,730 | Mirfield | Aug. 4, 1925 |
| 1,715,679 | Joksch | June 4, 1929 |
| 1,848,616 | Fottinger | Mar. 8, 1932 |
| 2,110,266 | Groene et al. | Mar. 8, 1938 |
| 2,113,509 | Groene et al. | Apr. 5, 1938 |
| 2,658,415 | Barowsky | Nov. 10, 1953 |
| 2,708,018 | Dudley | May 10, 1955 |

FOREIGN PATENTS

| | | |
|---|---|---|
| 76,279 | Austria | Apr. 25, 1919 |
| 646,573 | Germany | Aug. 28, 1937 |